US009471095B2

(12) United States Patent
Ho et al.

(10) Patent No.: US 9,471,095 B2
(45) Date of Patent: Oct. 18, 2016

(54) FASTENING ASSEMBLY, HOUSING, AND DISASSEMBLING METHOD OF HOUSING

(71) Applicant: HTC Corporation, Taoyuan, Taoyuan County (TW)

(72) Inventors: San-Chi Ho, Taoyuan (TW); Kai-Jin Hung, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 340 days.

(21) Appl. No.: 13/957,471

(22) Filed: Aug. 2, 2013

(65) Prior Publication Data

US 2015/0035417 A1 Feb. 5, 2015

(51) Int. Cl.
*E05C 17/56* (2006.01)
*G06F 1/16* (2006.01)
*H04M 1/02* (2006.01)
*E05C 19/16* (2006.01)

(52) U.S. Cl.
CPC .............. *G06F 1/16* (2013.01); *H04M 1/0249* (2013.01); *Y10T 29/49822* (2015.01); *Y10T 403/60* (2015.01)

(58) Field of Classification Search
CPC ............. Y10T 292/11; Y10T 70/7057; E05B 47/004; E05B 47/0038; E05B 73/0052
USPC ...................................................... 292/251.5
See application file for complete search history.

(56) References Cited

U.S. PATENT DOCUMENTS 2,809,062 A * 10/1957 Mainhardt ................... 292/144
3,744,833 A * 7/1973 Berducone ................. 292/251.5
5,996,831 A * 12/1999 Teok ............................ 220/230

FOREIGN PATENT DOCUMENTS

CN 103104576 A 5/2013
TW 201133197 A 10/2011

OTHER PUBLICATIONS

TW Office Action dated Jun. 26, 2015 in corresponding Taiwan application (No. 102132615).

* cited by examiner

*Primary Examiner* — Mark Williams
(74) *Attorney, Agent, or Firm* — McClure, Qualey & Rodack, LLP

(57) ABSTRACT

A fastening assembly used into a first workpiece and a second workpiece is provided. The fastening assembly includes a first engaging member, a reciprocating member and a second engaging member. The first engaging member is fixed to the first workpiece. The reciprocating member is fixed to a first side of the second workpiece and capable of reciprocally moving relative to the second workpiece. The second engaging member is connected to the reciprocating member for engaging with the first engaging member. After the fastening assembly is affected by a magnetic force from a second side of the second workpiece, the reciprocating member is shifted, and the second engaging member is separated from the first engaging member.

13 Claims, 7 Drawing Sheets

FASTENING ASSEMBLY, HOUSING, AND DISASSEMBLING METHOD OF HOUSING

BACKGROUND

1. Technical Field

The present disclosure relates to a fastening assembly, a housing the fastening assembly, and a disassembling method of housing.

2. Description of Related Art

In general, an electronic apparatus (e.g., a cell phone, a PDA, a notebook computer, etc.) has a housing assembled by a first cover and a second cover. The housing is used to cover and accommodate inner electronic components of the electronic apparatus, so as to provide protection to the electronic components and prevent the electronic components from damage of collisions.

With progress of technologies, electronic apparatuses (e.g., portable electronic apparatuses) are developed toward a lightweight, and compact design, along with severe limits to inner spaces of housings for the electronic apparatuses. To disassemble a housing, it is conventionally required to design a first cover and a second cover with assembly structures that can be "engaged with" or "released from" each other. For example, the engaging member on the first cover can be engaged with the engaging member on the second cover. That is, the first cover and the second cover can be assembled to each other by pressing them together and make the engaging members engage with each other.

However, even if the foregoing assembly structures facilitate assembly of the housing, a disassembling tool is needed to disassemble the engaging members of the first cover and the second cover. Further, the housing must have additional inner space or opening for the disassembling tool to pass into to contact and thus separate the engaging members. Hence, concerning the aforementioned issues, it becomes more difficult in design of the housing and maintenance of the electronic components.

SUMMARY

In order to solve the problems of the prior art, the disclosure provides an improved fastening assembly. Particularly, the fastening assembly is applied in a housing. The housing includes a first workpiece and a second workpiece. The fastening assembly includes a first engaging member, a reciprocating member, and a second engaging member. The first engaging member is fixed to the first workpiece. The reciprocating member is fixed to a first side of the second workpiece and capable of reciprocally moving relative to the second workpiece. The second engaging member is connected to the reciprocating member for engaging with the first engaging member. After a non-contact force from a second side of the second workpiece affects the fastening assembly, the reciprocating member is shifted, and the second engaging member is separated from the first engaging member.

The disclosure further provides a housing. The housing includes a first workpiece, a second workpiece, and a fastening assembly. The second workpiece is assembled to the first workpiece. The fastening assembly is disposed in the housing and includes a first engaging member, a reciprocating member, and a second engaging member. The first engaging member is fixed to the first workpiece. The reciprocating member is fixed to the second workpiece and capable of moving relative to the second workpiece. The second engaging member is connected to the reciprocating member for engaging with the first engaging member. After a non-contact force from a second side of the second workpiece affects the fastening assembly, the reciprocating member is shifted, and the second engaging member is separated from the first engaging member.

The disclosure further provides a disassembling method of housing. The disassembling method of housing includes: providing a housing, in which the housing includes a first workpiece, a second workpiece, and a fastening assembly, the fastening assembly is disposed in the housing and includes a first engaging member, a reciprocating member, and a second engaging member, the first engaging member is fixed to the first workpiece, the reciprocating member is fixed to a first side of the second workpiece, and the second engaging member is connected to the reciprocating member and engaged with the first engaging member; affecting the fastening assembly by a non-contact force at the outside of the housing, so as to shorten the length of the reciprocating member along a direction perpendicular to the first side and make the second engaging member separate from the first engaging member; and separating the first workpiece and the second workpiece.

The fastening assembly, the housing, and the disassembling method of housing of the disclosure at least can solve the problems of prior arts. The housing of the disclosure fixes the first engaging member to the first workpiece, and integrates the second engaging member that is engaged with the first engaging member to the fastening assembly. Because the second engaging member with complicated structure does not manufactured on the second workpiece, the molds for manufacturing the second workpiece can be simple, which not only saves costs of the molds, but also increases degrees of freedom to design the molds. Furthermore, the engagement status of the fastening assembly of the disclosure can be released after the fastening assembly receives a non-contact force, so the housing can be disassembled without a particular disassembling tool, and thus the consumed time of reworking and the costs of waste materials can be reduced.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
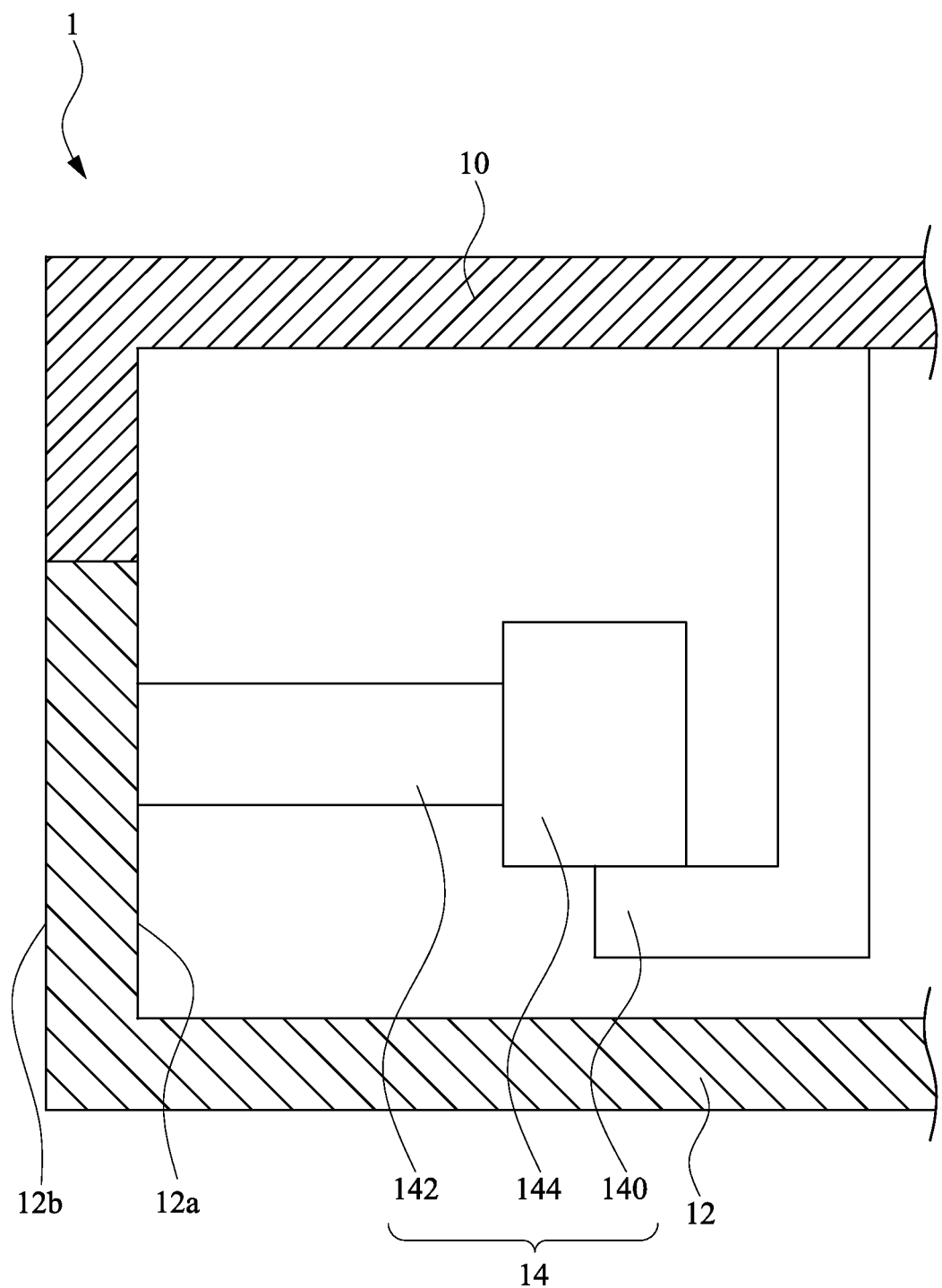
FIG. 1A is a partial sectional view of a housing according to an embodiment of the disclosure, in which a first engaging member and the second engaging member are engaged with each other.

Reference will now be made in detail to the present embodiments of the disclosure, examples of which are illustrated in the accompanying drawings. Wherever possible, the same reference numbers are used in the drawings and the description to refer to the same or like parts.

Figure 1B:
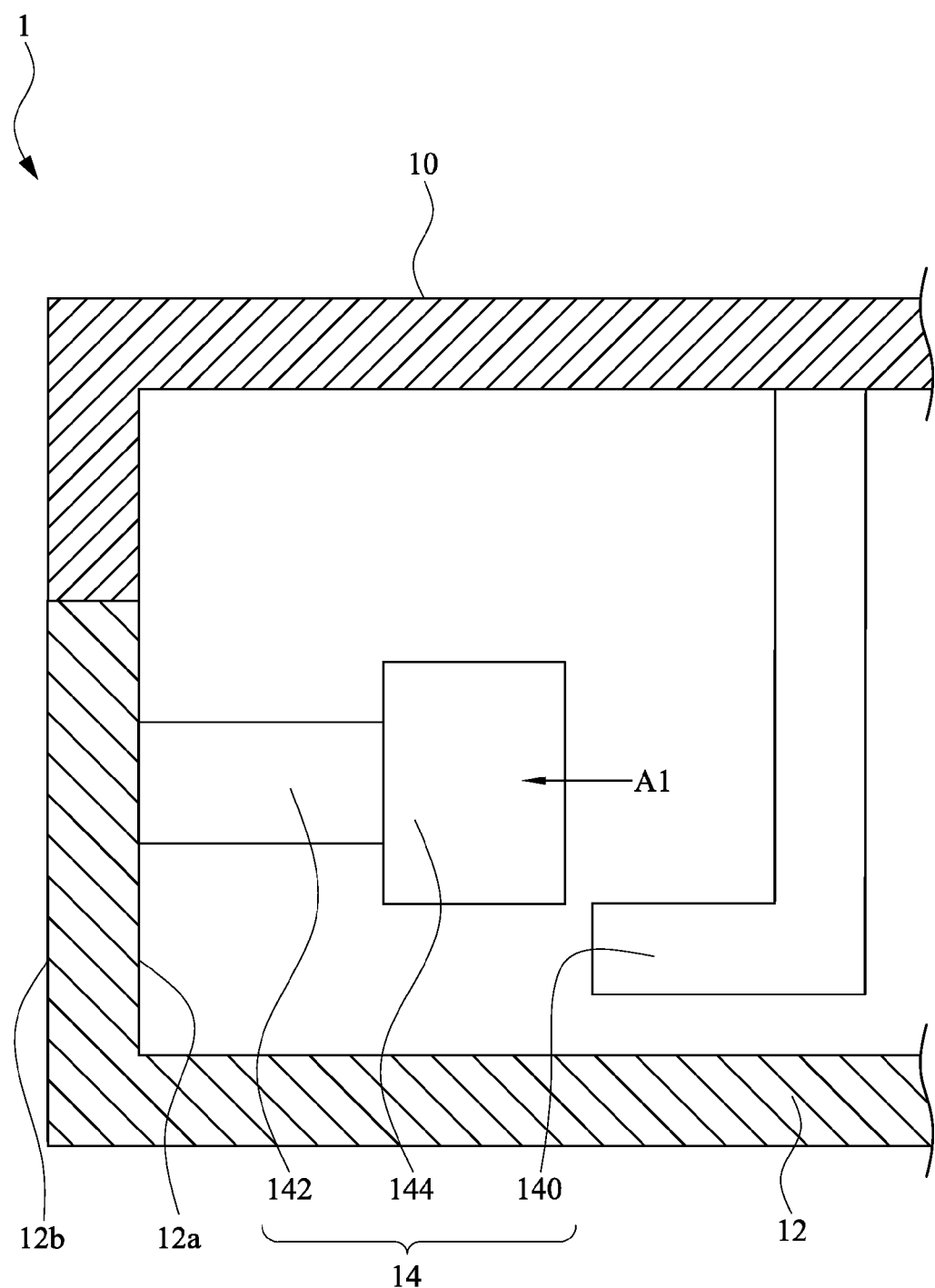
FIG. 1B is another partial sectional view of the housing in FIG. 1A, in which the second engaging member is separated from the first engaging member.
Figure 1C:
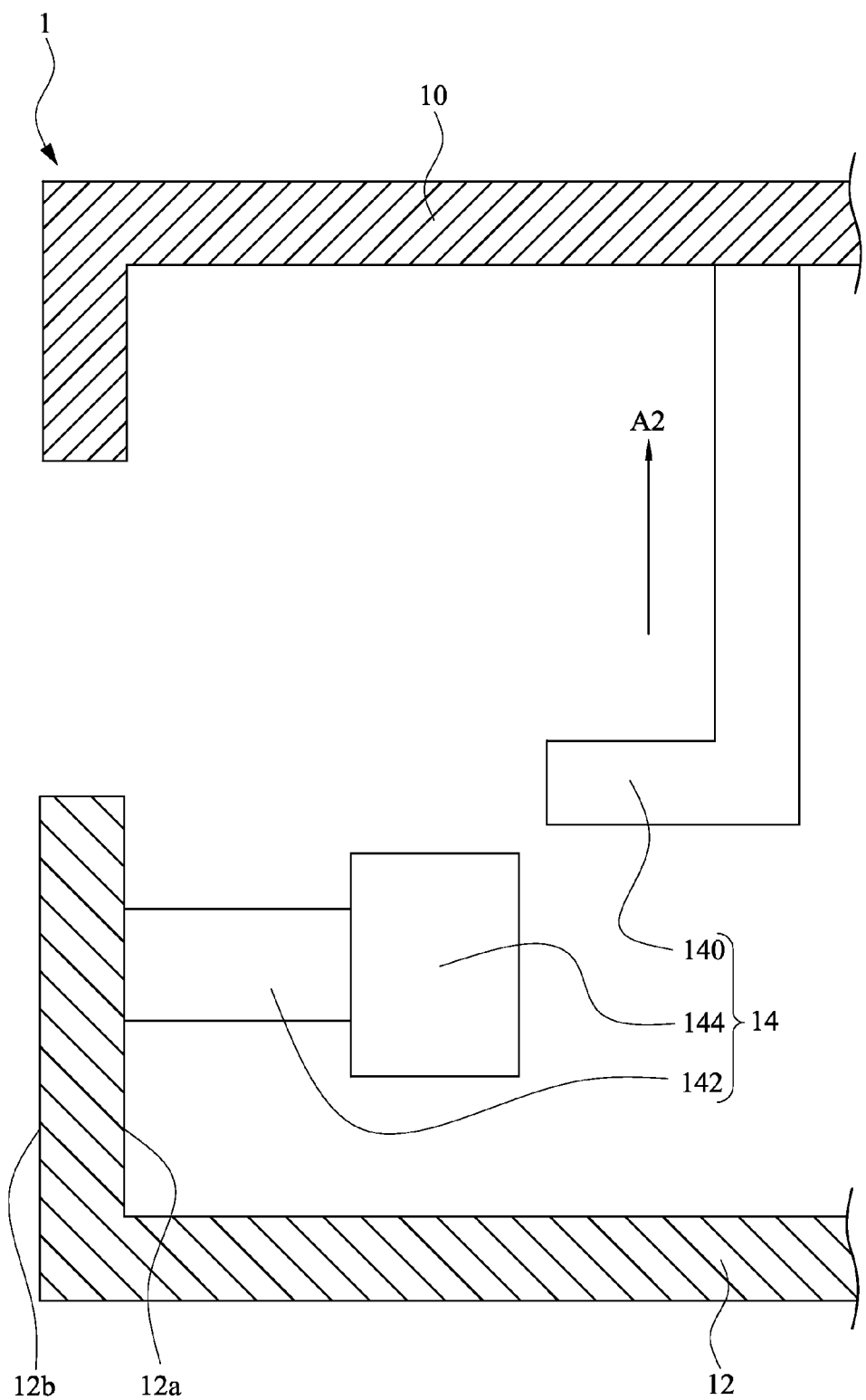
FIG. 1C is another partial sectional view of the housing in FIG. 1A, in which the first workpiece is separated from the second workpiece.

Refer to FIG. 1A, FIG. 1B, and FIG. 1C. FIG. 1A is a partial sectional view of a housing 1 according to an embodiment of the disclosure, in which a first engaging member 140 and the second engaging member 144 are engaged with each other. FIG. 1B is another partial sectional view of the housing 1 in FIG. 1A, in which the second engaging member 144 is separated from the first engaging member 140. FIG. 1C is another partial sectional view of the housing 1 in FIG. 1A, in which the first workpiece 10 is separated from the second workpiece 12.

As shown in FIG. 1A, the housing 1 includes a first workpiece 10, a second workpiece 12, and a fastening assembly 14. The second workpiece 12 of the housing 1 is assembled to the first workpiece 10. The fastening assembly 14 is located in the housing 1, and includes a first engaging member 140, a reciprocating member 142, and a second engaging member 144. The first engaging member 140 of the fastening assembly 14 is fixed to the first workpiece 10. The reciprocating member 142 of the fastening assembly 14 is fixed to a first side 12a of the second workpiece 12 and is capable of reciprocally moving relative to the second workpiece 12 along a first direction A1. The second engaging member 144 of the fastening assembly 14 is connected to the reciprocating member 142 for engaging with the first engaging member 140. An electronic apparatus that use the housing 1 of the disclosure can be a portable electronic apparatus (e.g., a smart phone, a PDA, a GPS, etc.), but the disclosure is not limited in this regard.

In the embodiment of the disclosure, the first engaging member 140 and the reciprocating member 142 of the fastening assembly 14 are respectively fixed to the first workpiece 10 and the second workpiece 12 by using glue, but the disclosure is not limited in this regard.

As shown in FIG. 1B, after a non-contact force from a second side 12b of the second workpiece 12 (i.e., the outside of the housing 1) affects the fastening assembly 14, the reciprocating member 142 is shifted (i.e., the length of the reciprocating member 142 along the first direction A1 is shortened toward the second workpiece 12), and the second engaging member 144 is separated from the first engaging member 140 along the first direction A1. Therefore, the first workpiece 10 of the housing 1 can separate from the second workpiece 12 along a second direction A2 (as shown in FIG. 1C).

In the embodiment of the disclosure, the first direction A1 and the second direction A2 are perpendicular to each other, but the disclosure is not limited in this regard.

In the embodiment of the disclosure, the fastening assembly 14 of the housing 1 is disposed at the first side 12a of the second workpiece 12, but the disclosure is not limited in this regard. In another embodiment of the disclosure, the fastening assembly 14 is disposed at the bottom of the second workpiece 12. For example, a pillar (not shown) can be disposed at the bottom of the second workpiece 12, and the fastening assembly 14 is fixed to the pillar.

Hence, it can be seen that the engagement status of the fastening assembly 14 of the housing 1 can be released after the fastening assembly 14 receives a non-contact force. Embodiments of the housing 1 and the fastening assembly 14 are described below.

Figure 2:
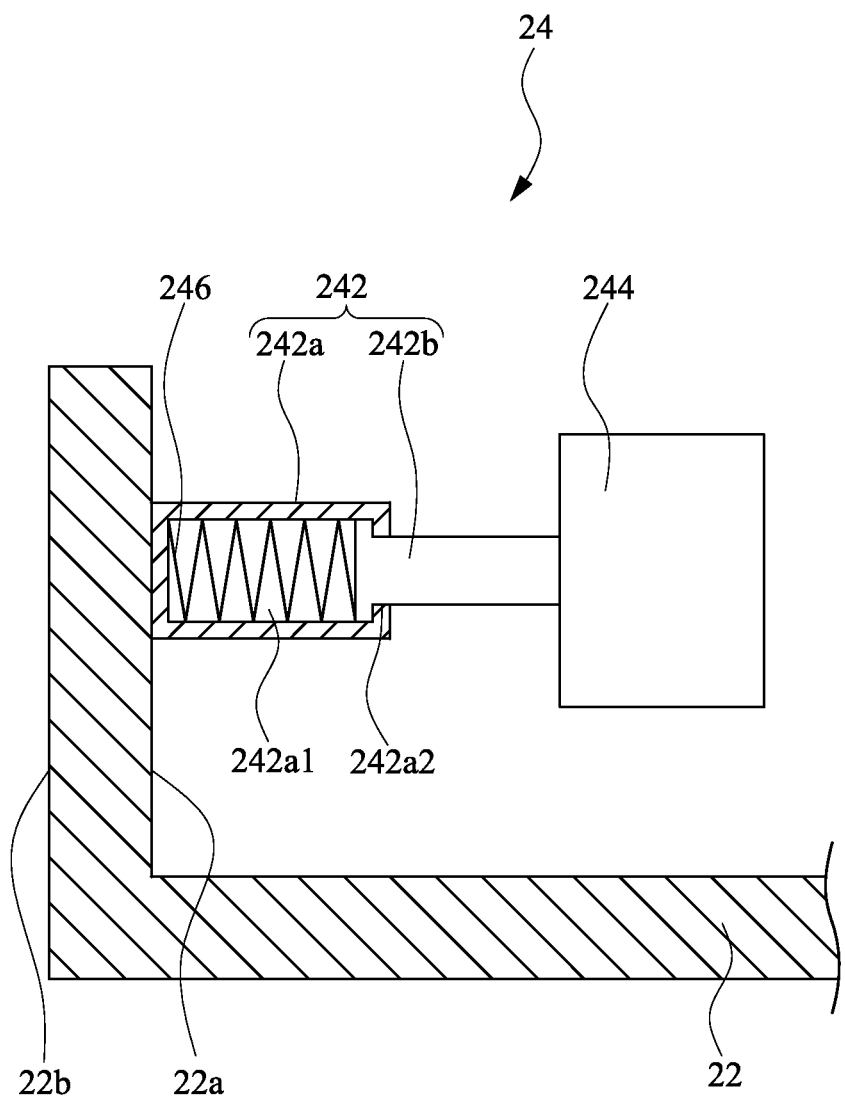
FIG. 2 is a partial sectional view illustrating a fastening assembly fixed to a second workpiece according to another embodiment of the disclosure.

Refer to FIG. 2. FIG. 2 is a partial sectional view illustrating a fastening assembly 24 fixed to a second workpiece 22 according to another embodiment of the disclosure.

As shown in FIG. 2 with reference to FIG. 1A and FIG. 1B, the reciprocating member 242 of the fastening assembly 24 includes a fixing part 242a and a moving part 242b. The fixing part 242a of the reciprocating member 242 is fixed to the first side 22a of the second workpiece 22. The moving part 242b of the reciprocating member 242 is engaged with the fixing part 242a and is capable of sliding relative to the fixing part 242a along the first direction A1 to expand or close up. The second engaging member 244 of the fastening assembly 24 is connected to the moving part 242b.

Furthermore, the fixing part 242a of the reciprocating member 242 has a chamber 242a1 and an opening 242a2. The moving part 242b passes into the chamber 242a1 via the opening 242a2 of the fixing part 242a. That is, the fixing part 242a of the reciprocating member 242 is sleeved onto the moving part 242b, so as to make the moving part 242b be able to slide relative to the fixing part 242a to expand or close up.

In the embodiment of the disclosure, the non-contact force at the outside of the housing 1 is a magnetic force. The moving part 242b of the reciprocating member 242 includes a magnetically permeable material. Therefore, after the moving part 242b of the reciprocating member 242 is attracted by the magnetic force at the second side 22b of the second workpiece 22, the moving part 242b closes up to the chamber 242a1 of the fixing part 242a along the first direction A1, makes the second engaging member 244 separate from the first engaging member 140, and thus releases the engagement status. Then, the first workpiece 10 of the housing 1 (as shown in FIG. 1C) can be separated from the second workpiece 22 along the second direction A2.

However, the disclosure is not limited in this regard. In another embodiment of the disclosure, the second engaging member 244 of the fastening assembly 24 includes a magnetically permeable material. Therefore, after the second engaging member 244 is attracted by the magnetic force, the second engaging member 244 moves toward the second workpiece 22 to separate from the first engaging member 140, makes the moving part 242b of the reciprocating member 242 close up to the fixing part 242a, and thus releases the engagement status.

Furthermore, in order to make the second engaging member 244 of the fastening assembly 24 recover the original location to engage the first engaging member 140 when assembling the first workpiece 10 and the second workpiece 22 of the housing 1, the fastening assembly 24 of the disclosure further includes a spring 246. The spring 246 is disposed in the chamber 242a1 of the fixing part 242a and is compressed between the fixing part 242a and the moving part 242b. Therefore, after the magnetic force at the outside of the housing 1 disappears, the spring 246 of the fastening assembly 24 pushes the moving part 242b of the reciprocating member 242 along the reverse direction of the first direction A1 and thus moves the second engaging member 244 away from the second workpiece 22 to recover the original location.

Figure 3:
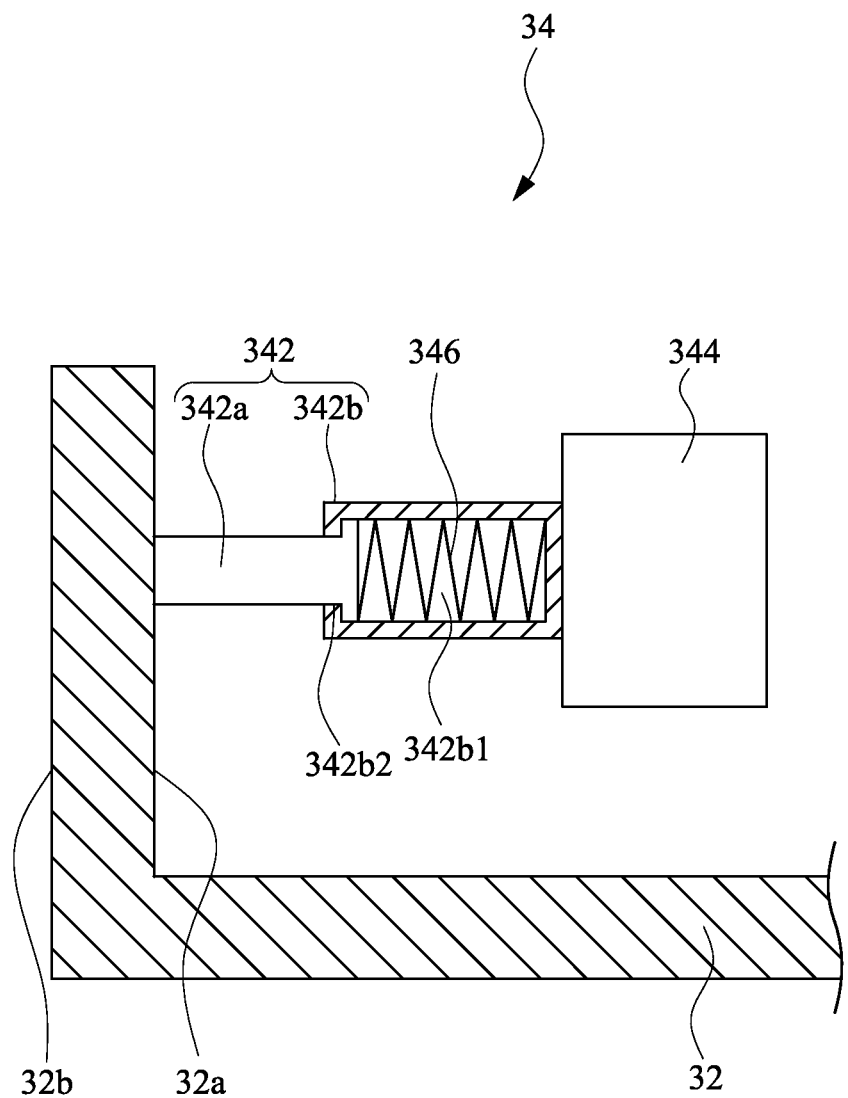
FIG. 3 is a partial sectional view illustrating a fastening assembly fixed to a second workpiece according to another embodiment of the disclosure.

Refer to FIG. 3. FIG. 3 is a partial sectional view illustrating a fastening assembly 34 fixed to a second workpiece 32 according to another embodiment of the disclosure.

As shown in FIG. 3 with reference to FIG. 1A and FIG. 1B, the reciprocating member 342 of the fastening assembly 34 includes a fixing part 342a and a moving part 342b. The fixing part 342a of the reciprocating member 342 is fixed to the first side 32a of the second workpiece 32. The moving part 342b of the reciprocating member 342 is engaged with the fixing part 342a and is capable of sliding relative to the fixing part 342a along the direction A1 to expand or close up. The second engaging member 344 of the fastening assembly 34 is connected to the moving part 342b.

It should be pointed out that this embodiment compared with the other embodiment in FIG. 2, the moving part 342b of the reciprocating member 342 of the present embodiment has a chamber 342b1 and an opening 342b2. The fixing part 342a of the reciprocating member 342 passes into the chamber 342b1 via the opening 342b2 of the moving part 342b. That is, the moving part 342b of the reciprocating member 342 is sleeved onto the fixing part 342a, so as to make the moving part 342b reciprocally slide relative to the fixing part 342a to expand or close up.

In the embodiment of the disclosure, the non-contact force at the outside of the housing 1 is magnetic force. The moving part 342b of the reciprocating member 342 includes a magnetically permeable material. Therefore, after the moving part 342b of the reciprocating member 342 is attracted by the magnetic force from the second side 32b of the second workpiece 32, the moving part 342b moves toward the fixing part 342a along the first direction A1, so as to make the fixing part 342a close up to the chamber 342b1 of the moving part 342b, make the second engaging member 244 separate from the first engaging member 140, and thus release the engagement status. Then, the first workpiece 10 of the housing 1 (as shown in FIG. 1C) can be separated from the second workpiece 32 along the second direction A2.

However, the disclosure is not limited in this regard. In another embodiment of the disclosure, the second engaging member 344 of the fastening assembly 34 includes a magnetically permeable material. Therefore, after the second engaging member 344 is attracted by the magnetic force, the second engaging member 344 moves toward the second workpiece 32 to separate from the first engaging member 140, makes the moving part 342b of the reciprocating member 342 close up to the fixing part 342a, and thus releases the engagement status.

Furthermore, in order to make the second engaging member 344 of the fastening assembly 34 recover the original location to engage the first engaging member 140 when assembling the first workpiece 10 and the second workpiece 32 of the housing 1, the embodiment shows that the fastening assembly 34 further includes a spring 346. The spring 346 is disposed in the chamber 342b1 of the moving part 342b and is compressed between the fixing part 342a and the moving part 342b. Therefore, after the magnetic force at the outside of the housing 1 disappears, the spring 346 of the fastening assembly 34 pushes the moving part 342b of the reciprocating member 342 along the reverse direction of the first direction A1 and thus moves the second engaging member 344 away from the second workpiece 32 to recover the original location.

Figure 4:
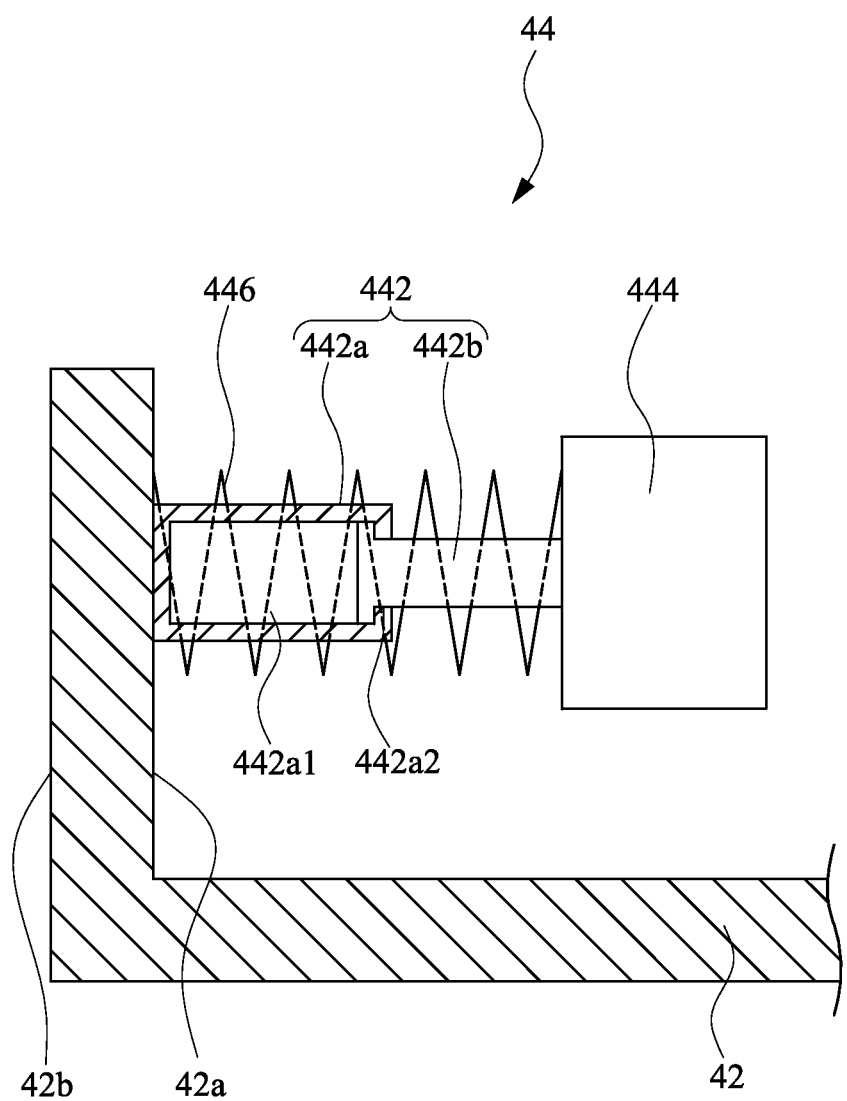
FIG. 4 is a partial sectional view illustrating a fastening assembly fixed to a second workpiece according to another embodiment of the disclosure.

Refer to FIG. 4. FIG. 4 is a partial sectional view illustrating a fastening assembly 44 fixed to a second workpiece 42 according to another embodiment of the disclosure.

As shown in FIG. 4 with reference to FIG. 1A and FIG. 1B, the fastening assembly 44 includes a spring 446, and the reciprocating member 442 of the fastening assembly 44 includes a fixing part 442a and a moving part 442b. The fixing part 442a of the reciprocating member 442 is fixed to the first side 42a of the second workpiece 42 and has a chamber 442a1 and an opening 442a2. The moving part 442b passes into the chamber 442a1 via the opening 442a2 of the fixing part 442a. That is, the fixing part 442a of the reciprocating member 442 is sleeved onto the moving part 442b, so as to make the moving part 442b be able to slide relative to the fixing part 442a to expand or close up. The second engaging member 444 of the fastening assembly 44 is connected to the moving part 442b.

In the embodiment of the disclosure, the non-contact force at the outside of the housing 1 is a magnetic force. The moving part 442b of the reciprocating member 442 includes a magnetically permeable material. Therefore, after the moving part 442b of the reciprocating member 442 is attracted by the magnetic force at the second side 42b of the second workpiece 42, the moving part 442b closes up to the chamber 442a1 of the fixing part 442a along the first direction A1, makes the second engaging member 444 separate from the first engaging member 140, and thus releases the engagement status. Or, in another embodiment of the disclosure, the second engaging member 444 of the fastening assembly 44 includes a magnetically permeable material. Therefore, after the second engaging member 444 is attracted by the magnetic force, the second engaging member 444 moves toward the second workpiece 42 along the first direction A1 to separate from the first engaging member 140, makes the moving part 442b of the reciprocating member 442 close up to the fixing part 442a, and thus releases the engagement status.

It should be pointed out that compared with the embodiment in FIG. 2, the spring 446 of the present embodiment is sleeved onto the reciprocating member 442 (rather than disposed in the chamber 442a1) and compressed between the second workpiece 42 and the second engaging member 444. Therefore, after the magnetic force at the outside of the housing 1 disappears, the spring 446 of the fastening assembly 44 pushes the second engaging member 244 away from the second workpiece 22 along the reverse direction of the first direction A1 and thus make the second engaging member 244 recover the original location.

In the embodiments of the disclosure, the attraction of the magnetic force is used, but the disclosure is not limited in this regard. In another embodiment of the disclosure, the repulsion of the magnetic force can also be embodied.

Figure 5:
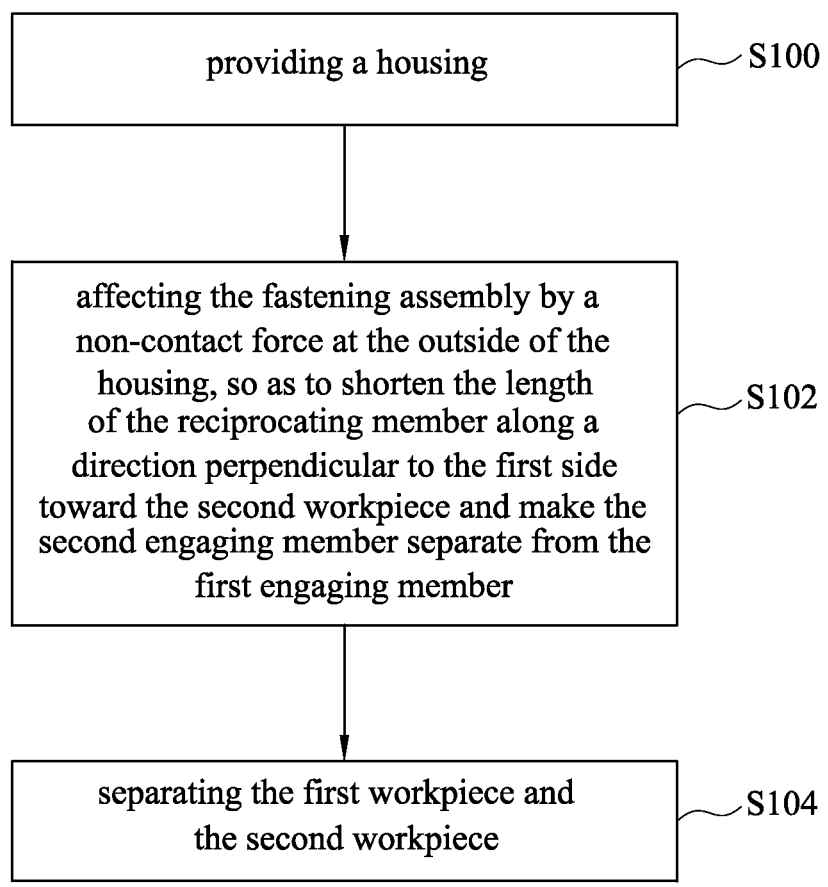
FIG. 5 is a flow diagram of a disassembling method of housing according to an embodiment of the disclosure.

The disclosure further provides a disassembling method of housing. Refer to FIG. 5. FIG. 5 is a flow diagram of a disassembling method of housing according to an embodiment of the disclosure, and the related explanations about FIG. 1A to FIG. 1C can also be referred. The disassembling method of housing of the embodiment includes following steps.

Step S100: providing a housing.

The housing includes a first workpiece, a second workpiece, and a fastening assembly. The fastening assembly is disposed in the housing and includes a first engaging member, a reciprocating member, and a second engaging member. The first engaging member is fixed to the first workpiece. The reciprocating member is fixed to a first side of the second workpiece. The second engaging member is connected to the reciprocating member and engaged with the first engaging member.

Step S102: affecting the fastening assembly by a non-contact force at the outside of the housing, so as to shorten the length of the reciprocating member along a direction perpendicular to the first side toward the second workpiece and make the second engaging member separate from the first engaging member.

Step S104: separating the first workpiece and the second workpiece.

Hence, it can be seen that the engagement status of the fastening assembly of the housing can be released after the fastening assembly receives a non-contact force. Embodiments of the disassembling method of housing are described below.

With reference to FIG. 2, FIG. 3, and FIG. 4, and the related explanations, in another embodiment of the disclosure, the reciprocating member includes a fixing part and a moving part. The fixing part of the reciprocating member is fixed to the first side of the second workpiece. The moving part of the reciprocating member is engaged with the fixing part and is capable of sliding relative to the fixing part to expand or close up. The second engaging member is connected to the moving part.

In the embodiment of the disclosure, the moving part of the reciprocating member includes a magnetically permeable material, and the foregoing step S102 can be replaced by step S202.

Step S202: applying the magnetic force to the moving part, so as to make the moving part close up to the fixing part, and make the second engaging member separate from the first engaging member.

With reference to FIG. 2, FIG. 3, and FIG. 4, and the related explanations, in another embodiment of the disclosure, the reciprocating member also includes a fixing part and a moving part.

In the embodiment of the disclosure, the second engaging member of the fastening assembly includes a magnetically permeable material, and the foregoing step S102 can be replaced by step S302.

Step S302: applying the magnetic force to the second engaging member, so as to make the second engaging member move toward the second workpiece to separate from the first engaging member, and make the moving part close up to the fixing part.

According to the foregoing recitations of the embodiments of the disclosure, it can be seen that the fastening assembly, the housing, and the disassembling method of housing of the disclosure at least can solve the problems of prior arts. The housing of the disclosure fixes the first engaging member to the first workpiece, and integrates the second engaging member that is engaged with the first engaging member to the fastening assembly. Because the second engaging member with complicated structure does not manufactured on the second workpiece, the molds for manufacturing the second workpiece can be simple, which not only saves costs of the molds, but also increases degrees of freedom to design the molds. Furthermore, the engagement status of the fastening assembly of the disclosure can be released after the fastening assembly receives a non-contact force, so the housing can be disassembled without a particular disassembling tool, and thus the consumed time of reworking and the costs of waste materials can be reduced.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A fastening assembly applicable to a housing, the fastening assembly comprising:
    a first engaging member fixed to a first workpiece of the housing;
    a reciprocating member fixed to a first side of a second workpiece of the housing; and
    a second engaging member connected to the reciprocating member for engaging with the first engaging member,
    wherein, after a non-contact force from a second side of the second workpiece affects the fastening assembly, the reciprocating member is shifted, and the second engaging member is separated from the first engaging member, wherein the first side and the second side are opposite sides of the second workpiece,
    wherein the reciprocating member comprises:
    a fixing part fixed to the first side of the second workpiece and extended away from the first side; and
    a moving part engaged with the fixing part and capable of sliding toward or away from the fixing part, wherein the second engaging member is connected to the moving part,
    wherein the non-contact force is a magnetic force, the moving part comprises a magnetically permeable material, the moving part slides toward the fixing part after affected by the magnetic force, so as to make the first engaging member separate from the first engaging member.

2. The fastening assembly of claim 1, wherein the fixing part is sleeved onto the moving part.

3. The fastening assembly of claim 2, wherein the fixing part has a chamber and an opening, the moving part passes into the chamber via the opening, the fastening assembly further comprises a resilient member, and the resilient member is disposed in the chamber and is compressed between the fixing part and the moving part.

4. The fastening assembly of claim 1, wherein the moving part is sleeved onto the fixing part.

5. The fastening assembly of claim 4, wherein the moving part has a chamber and an opening, the fixing part passes into the chamber via the opening, the fastening assembly further comprises a resilient member, and the resilient member is disposed in the chamber and is compressed between the fixing part and the moving part.

6. The fastening assembly of claim 1, wherein the non-contact force is a magnetic force, the second engaging member includes a magnetically permeable material, the second engaging member moves toward the second workpiece to separate from the first engaging member after affected by the magnetic force, so as to make the moving part close up to the fixing part.

7. The fastening assembly of claim 1, further comprising a spring, the spring is sleeved onto the reciprocating member and is compressed between the second workpiece and the second engaging member.

8. A housing comprising:
    a first workpiece;
    a second workpiece assembled to the first workpiece; and
    a fastening assembly disposed in the housing and comprising:
    a first engaging member fixed to the first workpiece;
    a reciprocating member fixed to a first side of the second workpiece; and
    a second engaging member connected to the reciprocating member for engaging with the first engaging member, wherein after a non-contact force from a second side of the second workpiece affects the fastening assembly, the reciprocating member is shifted, and the second engaging member is separated from the first engaging member, wherein the first side and the second side are opposite sides of the second workpiece, wherein the reciprocating member comprises:

a fixing part fixed to the first side of the second workpiece and extended away from the first side; and a moving part engaged with the fixing part and capable of sliding toward or away from the fixing part, wherein the second engaging member is connected to the moving part, wherein the non-contact force is a magnetic force, the moving part comprises a magnetically permeable material, the moving part slides toward the fixing part after affected by the magnetic force, so as to make the first engaging member separate from the first engaging member.

9. The housing of claim 8, wherein the fixing part is sleeved onto the moving part.

10. The housing of claim 9, wherein the fixing part has a chamber and an opening, the moving part passes into the chamber via the opening, the fastening assembly further comprises a resilient member, and the resilient member is disposed in the chamber and is compressed between the fixing part and the moving part.

11. The housing of claim 8, wherein the moving part is sleeved onto the fixing part.

12. The housing of claim 11, wherein the moving part has a chamber and an opening, the fixing part passes into the chamber via the opening, the fastening assembly further comprises a resilient member, and the resilient member is disposed in the chamber and is compressed between the fixing part and the moving part.

13. The housing of claim 8, wherein the non-contact force is a magnetic force, the second engaging member includes a magnetically permeable material, the second engaging member moves toward the second workpiece to separate from the first engaging member after affected by the magnetic force, so as to make the moving part close up to the fixing part.

* * * * *